United States Patent
Munir

(10) Patent No.: US 11,196,492 B2
(45) Date of Patent: Dec. 7, 2021

(54) APPARATUS FOR PERSON IDENTIFICATION AND MOTION DIRECTION ESTIMATION

(71) Applicant: Robert Bosch GmbH, Stuttgart (DE)

(72) Inventor: Sirajum Munir, Pittsburgh, PA (US)

(73) Assignee: ROBERT BOSCH GMBH

( * ) Notice: Subject to any disclaimer, the term of this patent is extended or adjusted under 35 U.S.C. 154(b) by 0 days.

(21) Appl. No.: 16/393,534

(22) Filed: Apr. 24, 2019

(65) Prior Publication Data

US 2020/0343982 A1     Oct. 29, 2020

(51) Int. Cl.
| | | |
|---|---|---|
| *H04W 24/00* | (2009.01) | |
| *H04B 17/318* | (2015.01) | |
| *G06N 3/04* | (2006.01) | |
| *H04W 16/20* | (2009.01) | |
| *H04B 17/391* | (2015.01) | |

(52) U.S. Cl.
CPC ........ *H04B 17/318* (2015.01); *G06N 3/0454* (2013.01); *H04B 17/391* (2015.01); *H04W 16/20* (2013.01)

(58) Field of Classification Search
CPC ............................ G06Q 10/087; G06F 16/288
See application file for complete search history.

(56) References Cited

U.S. PATENT DOCUMENTS

| | | | |
|---|---|---|---|
| 10,305,766 B1 * | 5/2019 | Zhang | H04L 43/08 |
| 2015/0235161 A1 * | 8/2015 | Azar | G06Q 10/063114 |
| | | | 705/7.15 |
| 2015/0304180 A1 * | 10/2015 | Gloss | G06F 17/5022 |
| | | | 370/252 |
| 2016/0359532 A1 * | 12/2016 | Cao | H04B 7/0421 |
| 2017/0039661 A1 * | 2/2017 | Vanslette | G06Q 50/163 |
| 2017/0308248 A1 * | 10/2017 | Choi | H04L 67/12 |
| 2018/0259350 A1 * | 9/2018 | Al-Hamad | G01S 19/42 |
| 2019/0097826 A1 * | 3/2019 | Lewis | H04L 12/282 |

FOREIGN PATENT DOCUMENTS

| | | |
|---|---|---|
| EP | 3379850 A1 | 9/2018 |
| WO | 2016197648 A1 | 12/2016 |

OTHER PUBLICATIONS

Ma et al., "WiFi Sensing with Channel State Information: A Survery", ACM Comput. Surv., vol. 1, No. 1, Article 1, Jan. 2019, 35 pages.

Hochreiter et al., "Long Short-Term Memory", Neural Computations 9(8):1735-1780, 1997, 32 pages.

* cited by examiner

*Primary Examiner* — Khalid W Shaheed
(74) *Attorney, Agent, or Firm* — Dickinson Wright PLLC

(57) ABSTRACT

An apparatus comprising a wireless transceiver configured to communicate packet data with a mobile device associated with one or more persons in a vicinity of the wireless transceiver, and a controller in communication with the wireless transceiver and the camera, the controller configured to receive a plurality of packet data from one or more person, wherein the packet data includes at least amplitude information associated with the wireless channel communicating with the wireless transceiver, identify the one or more persons as a customer or employee in response to the packet data, and determine a motion projection of the one or more persons in response to the packet data and identification indicating the customer.

20 Claims, 5 Drawing Sheets

APPARATUS FOR PERSON IDENTIFICATION AND MOTION DIRECTION ESTIMATION

TECHNICAL FIELD

The present disclosure relates to wireless monitoring systems.

BACKGROUND

Retail stores, airports, convention centers, and smart areas/neighborhoods may monitor people in the vicinity. Motion direction of people may have various use cases in different applications. In many applications, cameras may be used to track people. Cameras in retail stores, for instance, may have cameras mounted in the ceiling looking downward and lack the ability to accurately identify people using facial recognition algorithms. Furthermore, facial recognition algorithms may not perform well in places where thousands of people may be located (e.g. an airport or a large retail store).

SUMMARY

According to one embodiment, an apparatus including a wireless transceiver configured to communicate packet data with a mobile device associated with one or more persons in a vicinity of the wireless transceiver, a camera configured to capture image data, and a controller in communication with the wireless transceiver and the camera, the controller configured to receive a plurality of packet data from the mobile device, wherein the packet data includes at least amplitude and phase information associated with the wireless channel communicating with the wireless transceiver, identify the one or more persons as a customer or employee in response to the packet data, and determine a motion projection of the one or more persons in response to the packet data and the identification of the person(s).

According to another embodiment, an apparatus includes a wireless transceiver configured to communicate packet data with a mobile device associated with one or more persons in a vicinity of the wireless transceiver, and a controller in communication with the wireless transceiver and the camera, the controller configured to receive a plurality of packet data from one or more person, wherein the packet data includes at least amplitude and phase information associated with the wireless channel communicating with the wireless transceiver, identify the one or more persons as a customer or employee in response to the packet data, and determine a motion projection of the one or more persons in response to the packet data and identification of the person(s).

According to yet another embodiment, a method of capturing image data utilizing a wireless transceiver includes receiving packet data from a mobile device associated with one or more persons in a vicinity of the wireless transceiver, obtaining image data associated with a camera associated with the wireless transceiver, receiving a plurality of packet data from the mobile device, wherein the packet data includes at least amplitude and phase information associated with the wireless channel communicating with the wireless transceiver, identifying the one or more persons as a customer or employee in response to the packet data, and determine a motion projection of the one or more persons in response to the packet data and the identification of the person(s).

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Wireless technologies may be utilized to identify and track people. For example, Bluetooth and WiFi packet sniffing may be used to identify and locate nearby people. However, such techniques mainly utilizes RSSI (Received Signal Strength Indicator). This may use the wireless signal to obtain coarse grained location (e.g. whether the person is within a radius of 50 meters). Furthermore, in order to locate a user, there may be techniques that require deployment of multiple receiving units to receive the same packet and then perform trilateration using RSSI values. The accuracy of these solutions may suffer due to fluctuations and lack of information provided by RSSI.

CSI (Channel State Information) may provide much richer information about how a signal propagates from the transmitter to a receiver and captures the combined effect of signal scattering, fading, and power decay with distance. A single system unit containing multiple antennas can utilize CSI values and reduce the effort of deploying multiple units. Of course, multiple units may lead to better performance.

Figure 1:
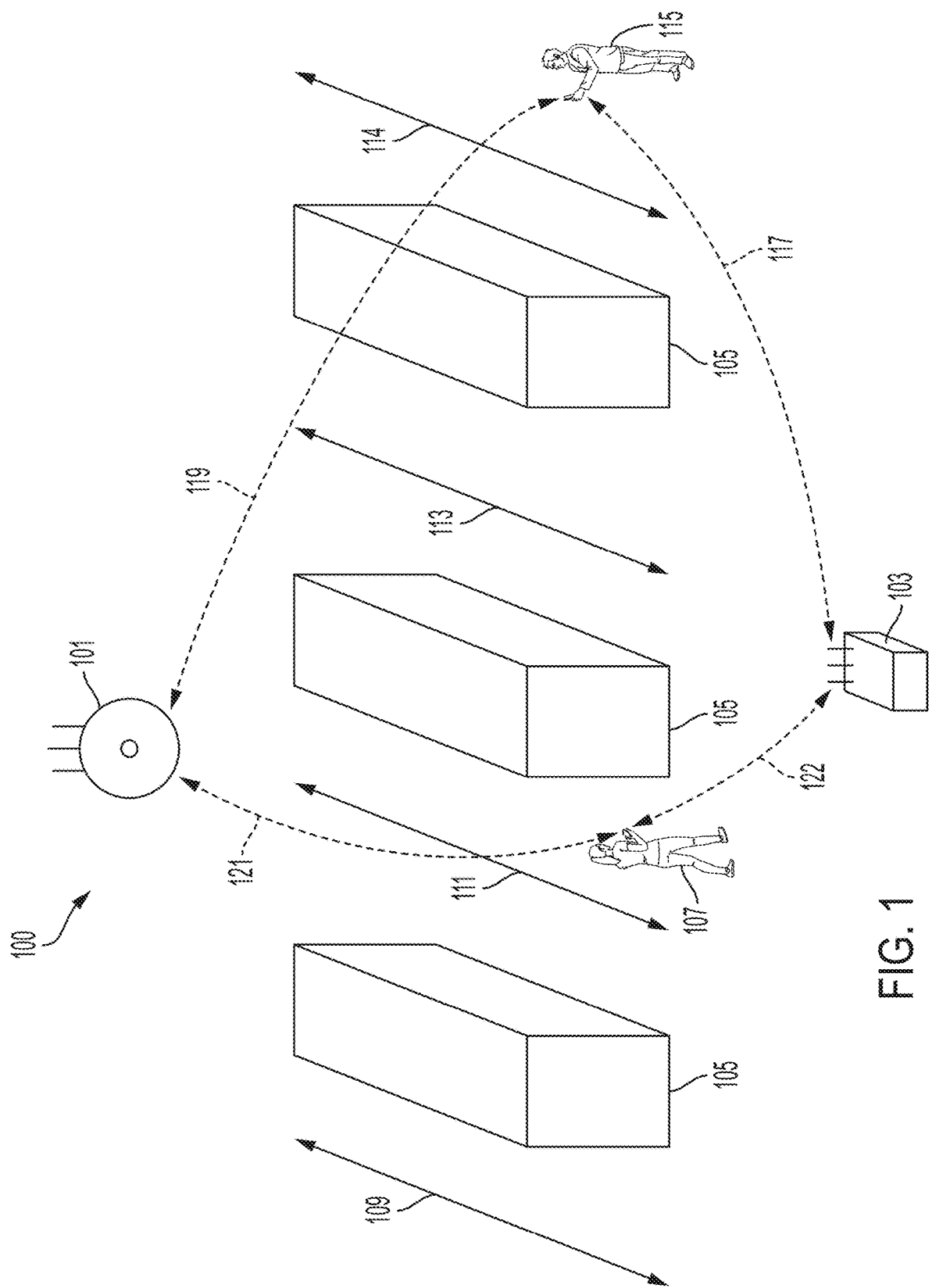
FIG. 1 is an overview system diagram of a wireless system according to an embodiment of the disclosure.

FIG. 1 is an overview system diagram of a wireless system 100 according to an embodiment of the disclosure. The wireless system 100 may include a wireless unit 101 that utilized to generate and communicate CSI data. The wireless unit 101 may communicate with mobile devices (e.g. cell phone, wearable device, tablet) of an employee 115 or a customer 107. For example, a mobile device of an employee 115 may send wireless signal 119 to the wireless unit 101. Upon reception of a wireless packet, system unit 101 obtains the associated CSI values of packet reception. Also, the wireless packet may contain identifiable information about the device ID, e.g., MAC address that is used to identify employee 115. Thus, the system 100 and wireless unit 101 may not utilize the data exchanged from the device of the employee 115 to determine various hot spots.

While WiFi may be utilized as a wireless communication technology, any other type of wireless technology may be utilized. For example, Bluetooth may be utilized if the system can obtain CSI from a wireless chipset. The system unit may be able to contain a WiFi chipset that is attached to up to three antennas, as shown by wireless unit 101 and wireless unit 103. The wireless unit 101 may include a camera to monitor various people walking around a POI. In another example, the wireless unit 103 may not include a camera and simply communicate with the mobile devices.

The system 100 may cover various aisles, such as 109, 111, 113, 114. The aisles may be defined as a walking path between shelving 105 or walls of a store front. The data collected between the various aisles 109, 111, 113, 114 may be utilized to generate a heat map and focus on traffic of a store. The system may analyze the data from all aisles and utilize that data to identify traffic of other areas of the store. For example, data collected from the mobile device of various customers 107 may identify areas that the store receive high traffic. That data can be used to place certain products. By utilizing the data, a store manager can determine where the high-traffic real estate is located versus low-traffic real estate.

The CSI data may be communicated in packets found in wireless signals. In one example, a wireless signal 121 may be generated by a customer 107 and their associated mobile device. The system 100 may utilize the various information found in the wireless signal 121 to determine whether the customer 107 is an employee or other characteristic. The customer 107 may also communicate with wireless unit 103 via signal 122. Furthermore, the packet data found in the wireless signal 121 may communicate with both wireless unit 101 or unit 103. The packet data in the wireless signal 121, 119, and 117 may be utilized to provide information related to motion prediction and traffic data related to mobile devices of employees/customers.

Figure 2:
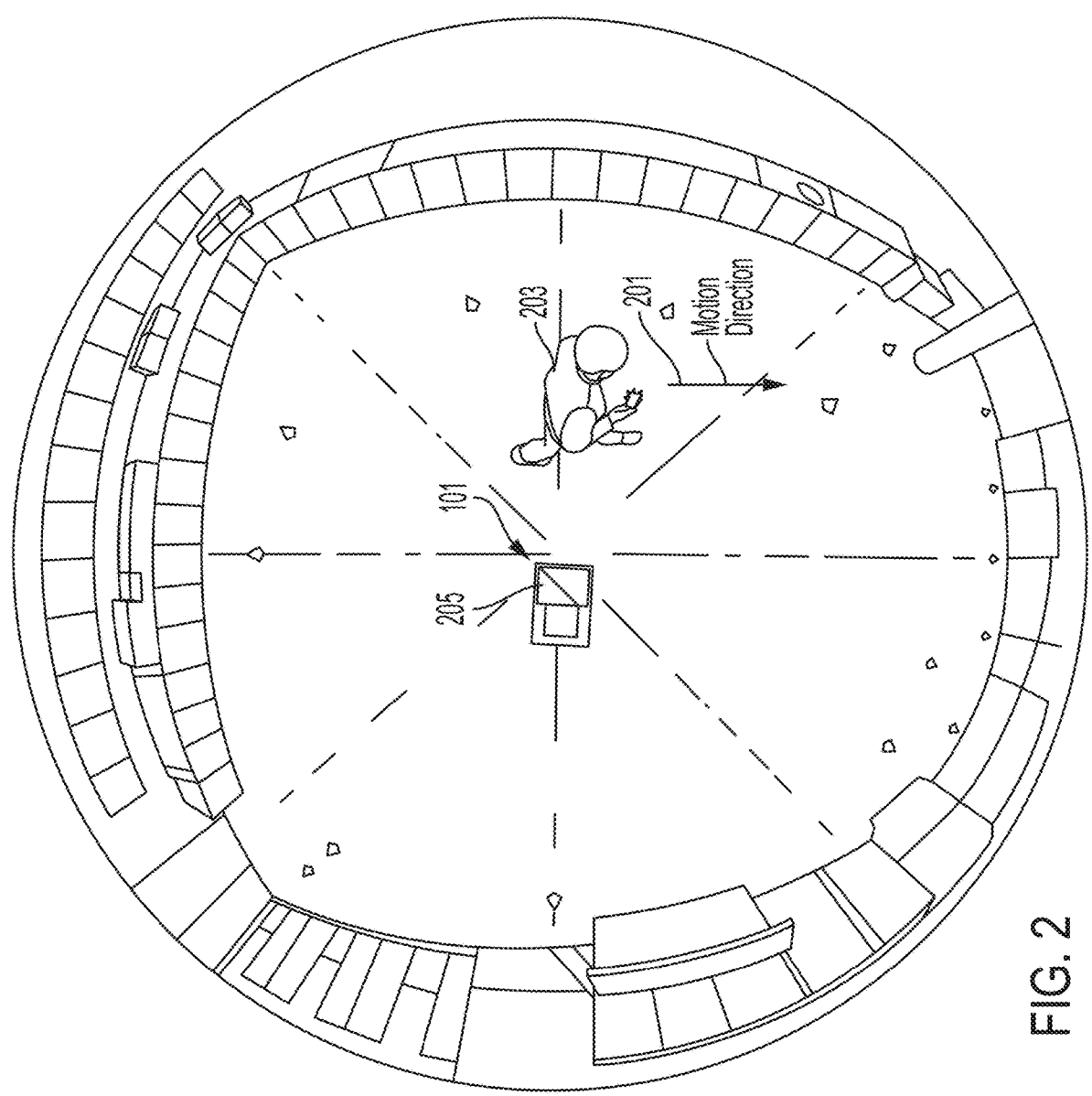
FIG. 2 is an exemplary image of the image data collected in a camera according to an embodiment in this disclosure.

FIG. 2 is an exemplary image of the image data collected in a camera according to an embodiment in this disclosure. The camera in FIG. 2 may be mounted in a wireless unit 101 in the ceiling, as shown by the image data. In other embodiments, the wireless unit 101 may be mounted anywhere else, such as a shelf or a wall. The estimated motion direction 201 of a person 203 is shown and can be predicted according to the various embodiments disclosed below. The image data that is captured by the camera may be utilized to collect information regarding a person (e.g. customer or employee) moving around certain space. As described further below, the image data may also be overlaid with a heatmap or other information.

Figure 3:
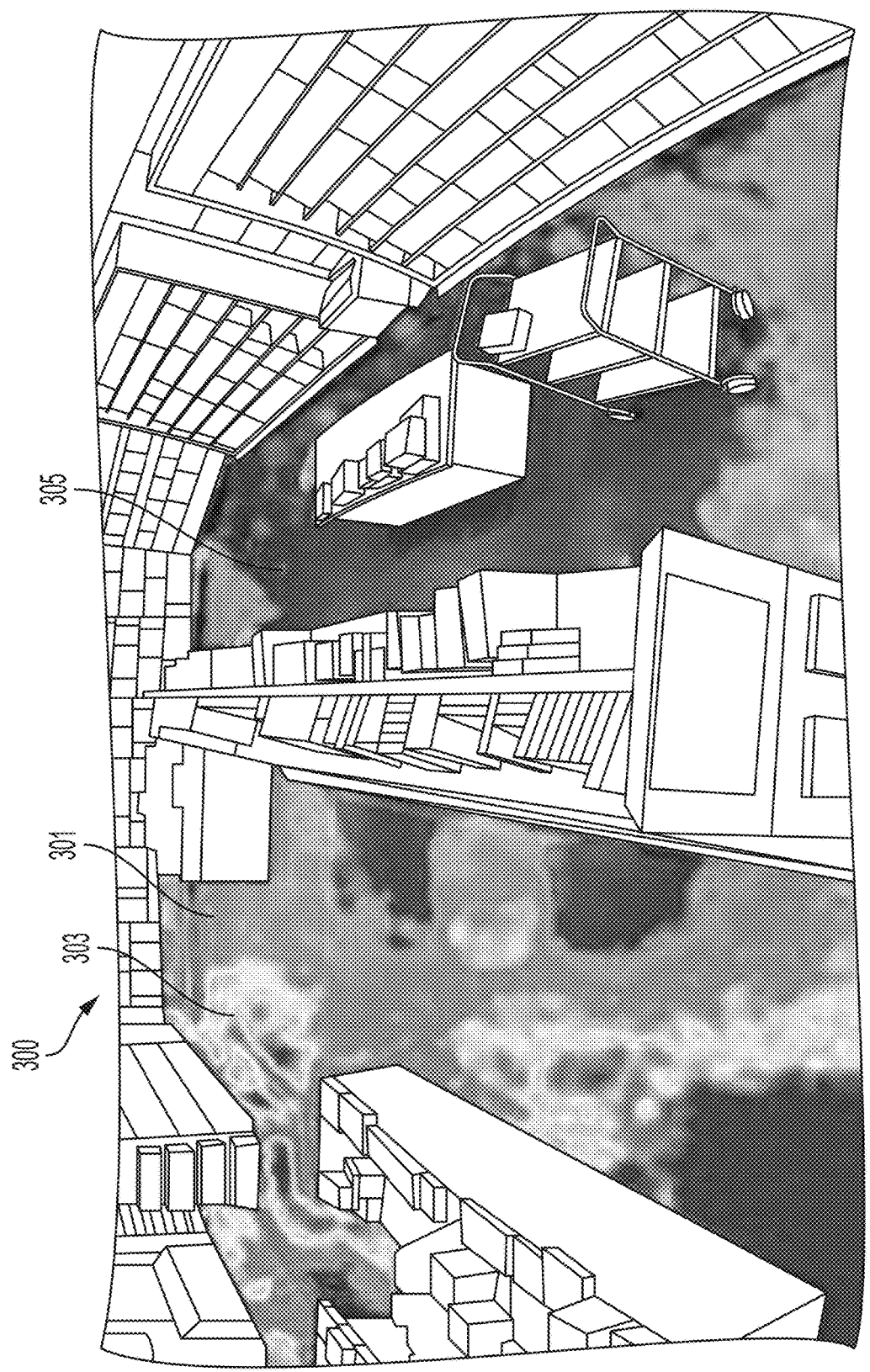
FIG. 3 is an exemplary heat map as utilized by a camera according to an embodiment of this disclosure.

FIG. 3 is an exemplary heat map 300 as utilized by a camera according to an embodiment of this disclosure. A camera based solution with the heat map usually can not differentiate customers from employees. Thus, identification of people may improve accuracy or usefulness of the heatmap. Accuracy of the heat map may be improved based on utilizing the CSI data generated by the wireless chipset. For example, a camera may estimate that 10 people may have entered through an aisle during a time period or time window (e.g. TW1, TW2). However, by identifying employees, the system may be able to recognize that two entrances in such an aisle were done by employees during that time window. Thus, the corrected or enhanced heatmap will display 8 customers that enter the entrance of the aisle instead of 10.

The heat map 300 may include different color regions that are laid out over an image of a store front or path. The regions may have different colors or shadings to indicate traffic of an area. For example, a medium-density 301 (medium-traffic) area may be laid out based on the traffic data collected by camera and/or the mobile device of various people within a retail store or any other type of space. The system may have a defined density for each level or shade of color on the heat map. In one example, the medium-density 301 area may have a yellow color or similar color.

In another embodiment, the heat map may have a low-density 303 (low-traffic) area that indicates an area that has low traffic. The low-traffic area 303 may be designated with a green color or perhaps a lighter shade or color in one embodiment. For example, a low-traffic area 303 may be designated as such because it has a specific volume of customers visiting that area per specified time frame. For example, less than 10 customers per hour may qualify as a low-traffic area 303, however, such a threshold for the low-traffic area may be variable or adjusted. A low-traffic area 303 may be designated as such because it has a very low volume of customers visiting that area per a specified time frame. The system may include various levels and shades of color to develop a heat-map to associate with various traffic density.

In another embodiment, the heat map may have a high-density 305 (high-traffic) area that indicates an area that has high traffic. The high-traffic area 305 may be designated with a red color or perhaps a darker shade in one embodiment. The system may help store managers or others to identify product placement, advertising, or other use-cases for areas with the varying traffic levels.

For example, a high-traffic area 305 may be designated as such because it has a specific volume of customers visiting that area per specified time frame. For example, 100 customers per hour. A low-traffic area 303 may be designated as such because it has a very low volume of customers visiting that area per a specified time frame. The system may include various levels and shades of color to develop a heat-map to associate with various traffic density.

Classifying motion direction may be done in multiple stages. Two examples of stages may be a training phase and a testing phase. During the training phase, the system unit may first track one or more subjects to move through an area several times carrying a wireless device such as a mobile phone. An application that is installed in the wireless device may send P packets per second over Wi-Fi. In one embodiment, P may be 10. Each of these packets received by the system unit and for each packet, the system may obtain K CSI values for each antenna. In a typical embodiment, K is 30. In a typical embodiment with 3 antennas, that may be 90 CSI values. Each CSI value may be a complex number contain the amplitude and phase associated with the Wi-Fi channel response. The system may extract channel frequency response (CFR) as CSI (channel state information). For three antennas and for 30 subcarriers associated with each antenna, it may obtain 3×30=90 CSI values.

During the CSI data collection, one or more video cameras may be utilized to capture video footage of the movement of the subjects. The clocks of the cameras and CSI values may be synchronized to ensure that the system can distinguish the CSI values for a particular type of movement. A dataset may be created using the collected CSI values and video footage. During the dataset construction, realistic cases may be considered (e.g. in a retail store it may include mobility of customers, employees, and objects of the store.)

Figure 4:
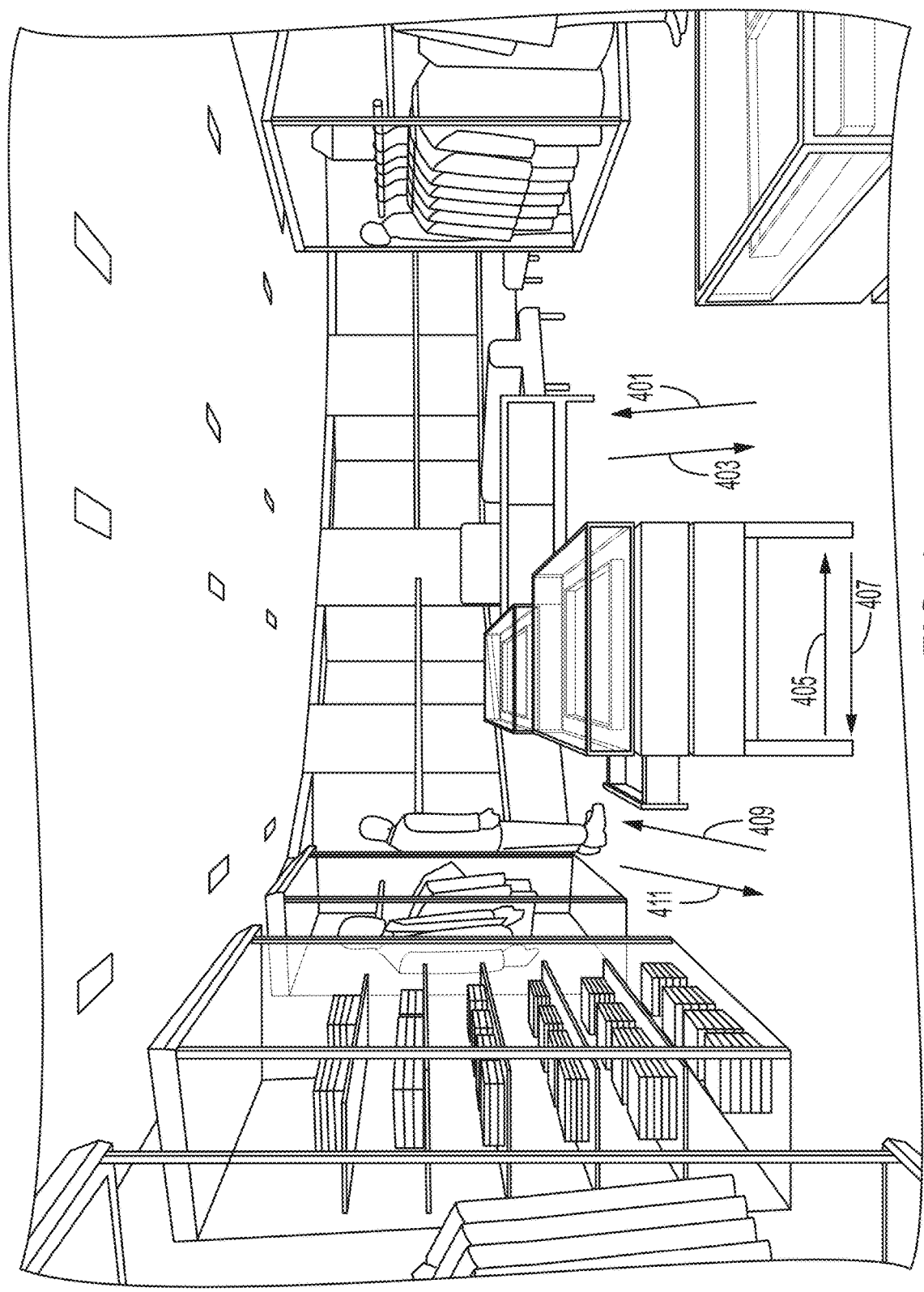
FIG. 4 is an example store front with various classes of movements.

FIG. 4 is an example store front with various classes of movements. Once data collection is completed, a dataset may be annotated for a specific type of movement of interest. Different types of movement may depend on the floorplan of the store. The store manager or logistical manager may be interested in the various movements. From video footage and data collected by the camera, the system may identify specific parts of the dataset that contains CSI data for these movements. After the annotation is completed, for each class of the movement (e.g. movements 401, 403, 405, 407, 409, and 411), we may have a sequence of CSI values. The system may train an LSTM (Long Short Term Memory) network with the sequence of CSI values for each class of movement.

LSTM is a variant of a recurrent neural network (RNN). Other RNN networks can also be used for this purpose, e.g., GRU (Gated Recurrent Unit). LSTMs may be useful for capturing dependencies in a time series data. An LSTM cell may include an input gate, an output, and a forget gate. Each cell is responsible for capturing the dependencies between the elements of the input CSI sequence. The input gate may control the extent to which a new value flows into the cell, the forget gate controls the extent to which a value remains in the cell and the output gate controls the extent to which the value in the cell is used to compute the output activation of the LSTM unit. For purposes of this disclosure, additional discussion regarding LTSM hereby incorporates by reference the publication "Long Short-Term Memory" by Hochreiter, S. Schmidhuber, Jü. (1997) and found at https://www.bioinfjku.at/publications/older/2604.pdf, which is herein incorporated by reference.

In the embodiment disclosed below, the LSTM may use a stack of LSTM cells rather than a single LSTM cell. However, a single LSTM cell may also be used. The input for this first LSTM cell may have a dimension of W×S, where W is a window of number of packets, and S is number of CSI values captured from each packet. In one embodiment, W may be 10, and S may be 180. For a sequence of 10 packets, the system may be trained to infer the motion direction. The system may get 90 CSI values per packet and each CSI value may be a complex number having amplitude and phase of each subcarrier of the wireless channel, thus providing 180 values (90 values of amplitude and 90 values of phase). The first LSTM cell may have an output dimension of OU1, which may be the input dimension of the second LSTM cell. The output dimension of the second LSTM cell may be defined as OU2. In one embodiment, OU1 may be 32 and OU2 may also be 32. The output of the second LSTM cell may be fed to a connected neural network layer with number of classes as output and a softmax activation function may be used. The motion direction class may be the highest probability of the class predicted by the LSTM network. Note that more LSTM cells can be stacked and other activation functions may also be used. Also, for training, as a loss function, categorical cross entropy may be used. However, other loss functions can also be used. As an optimizer, RMS prop or another similar algorithms utilized for neural networks may be used. Other optimizers may also be used, e.g., SGD (Stochastic Gradient Descent), Adam Optimizer. Note that each sequence of walk may be used to generate multiple window samples using a stride length L.

In one embodiment, L may be set as a defined value of 2. As an example, for a window size W=10 and for a walk of 5 seconds generating 500 packets at 10 packets per second along motion direction 409 of FIG. 4, the system may generate multiple window sequences to train the LSTM network for recognizing 409 motion direction at a stride of 2, taking the CSI values of packets between packet number [1,10], then between packet number [3, 13], then between packet number [5, 15]. In this way, for the 5 seconds walk, the system may have (500-10)/2=245 windows for training the motion direction 409. In this example, the system may reuse the data for training for the same walking direction estimation. The system may also include an "unknown" class of motion direction that represent a direction of motion that may be defined as irrelevant, e.g., a motion direction that is not like 401, 403, 405, 407, 409, and 411. The system may collect data for the "unknown" motion direction as well and annotate. In this embodiment, the LSTM model will not be forced to classify every motion direction to be either 401, 403, 405, 407, 409, and 411. In certain embodiment, the system could classify a motion direction as "unknown."

After the training mode is complete and an LSTM model is built, the system may use the model to classify and estimate motion direction during test time. At this phase, the system may continuously monitor CSI data of the WiFi packets (or other wireless packets) from mobile devices of customers or employees, and feed the same window W of samples into the trained LSTM model. The LSTM model may provide probability of each motion direction class at the final layer. The system may choose the motion direction class that has the highest probability. The MAC address of the corresponding WiFi packet may be used to identify the individual (e.g. employee versus a customer) and hence the system may provide an estimation and classification of the motion direction of the individual along with his/her identification.

In another embodiment, instead of three antennas, a different number of antennas may be used, e.g., one, two, four, and others. In yet another embodiment, instead of providing all the CSI values of all the subcarriers to the LSTM model, a PCA (Principal Component Analysis) is applied and first few major components are used, thus discarding CSI values from the noisy subcarriers. In another embodiment, RSSI is used in addition to CSI, or independently. In another embodiment, instead of people, robots or other objects carry wireless chipsets and they are identified, and their motion directions are estimated and classified. In another embodiment, instead of a smartphone, a fob or a device is carried that contains a wireless chipset. In another embodiment, instead of using a single system unit, a number of system units may be deployed throughout an area to capture mobility in different directions.

Figure 5:
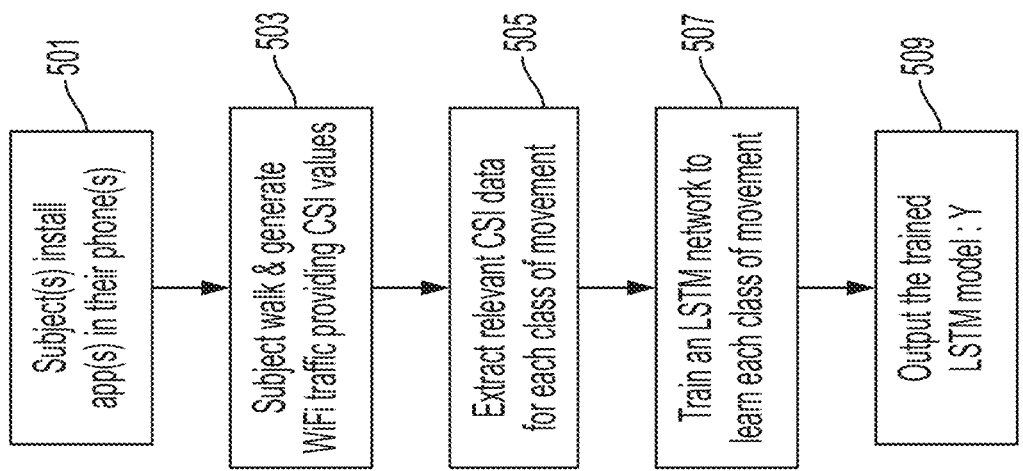
FIG. 5 is an exemplary flow chart of the training module or actions associated with an exemplary embodiment.

FIG. 5 is an exemplary flow chart of the training module or actions associated with an exemplary embodiment. At step 501, subject(s) may install an application on their mobile device(s) (e.g. phone or tablet). The application may be related to a specific retail store or point-of-interest (POI), such as an airport or convention center. In another embodiment, the application may be installed with the wireless transceiver's associated software (e.g. firmware), such as a Bluetooth transceiver or a WiFi transceiver.

At step 503, the subject with the loaded application may walk around the store or POI to generate WiFi traffic providing CSI values. The system (e.g. camera, wireless transceiver, base station, etc.) may collect the CSI values from the mobile devices that are loaded with the application as the subject walks around the POI.

At step 505, the system may extract the relevant CSI data for each class of movement. For example, a camera may also be used to collect image data. Then relevant CSI values for each class of movement are extracted by utilizing the cameras as described in [0025] and [0026]. A controller associated with the camera or wireless transceiver may be utilized to the process the information utilizing various calculations and algorithms. The classification of the movement data may include various movements that a customer may act out in various aisles or areas of a retail store or other POI.

At step 507, the system may train an LTSM network to learn each class of movement form the subjects using techniques listed above. The LTSM model is trained to track various types of movements. Thus, upon finishing a training mode, the system may operate in a standard mode and begin to track and predict motion of customers (or employees) in a store to help maximize real estate within the POI.

At step 509, the system may output the trained LSTM model, which is called model Y. The trained LSTM model may be utilized in the regular application to help determine movement classification of the customers or people located in a POI. For example, the LSTM model may be utilized to identify movement of people located in an airport that utilize a mobile application loaded on their phone.

In one use case, the model may be utilized for heatmap generation. For example, an employee may install an application on their phone. The system generates a heatmap of traffic throughout the POI using the cameras. For example, it may separately obtain the traffic of employees to the traffic of customers. The system may also generate a heatmap of the traffic using Wi-Fi CSI and model Y capturing the movement of employees.

In another use case, a first customer may install an application and generate WiFi traffic, while a second customer may utilize the store Wi-Fi application to browse or listen to music. The system may utilize the model Y to understand motion and direction of the customers throughout the store. Thus, the packet information from peoples are being sent in periodic spurts in order to be utilized to track motion and direction of the customers. The CSI values that are obtained from the mobile devices via the Wi-Fi signal. The CSI values are extracted via the application on the mobile device (e.g. first customer) or through use of the Wi-Fi (e.g. second customer). As such, the associated MAC address or a hashed value of the MAC address may be stored to understand customer specific behavior and customer store offerings.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An apparatus, comprising:
 a wireless transceiver configured to communicate packet data with a mobile device associated with one or more persons in a vicinity of the wireless transceiver;
 a camera configured to capture image data; and
 a controller in communication with the wireless transceiver and the camera, the controller configured to:
  receive a plurality of packet data from the mobile device, wherein the packet data includes channel state information that includes at least an amplitude information associated with a wireless channel communicating with the wireless transceiver;
  identify the one or more persons as a customer or employee in response to the packet data including identifiable information associated with the mobile device; and
  in response to the identifiable information identifying a customer, determine a motion projection of the one or more persons in response to the channel state information of the packet data, that includes at least the amplitude information associated with the wireless channel.

2. The apparatus of claim 1, wherein the controller is further configured to activate a training mode in response to an input.

3. The apparatus of claim 1, wherein the wireless transceiver includes three or more antennas.

4. The apparatus of claim 1, wherein the controller is configured to communicate with one or more applications stored on the mobile device.

5. The apparatus of claim 1, wherein the wireless transceiver is configured to receive a media access control (MAC) address associated with the mobile device and the controller is configured to hash the MAC address.

6. The apparatus of claim 1, wherein the wireless transceiver is configured to receive a media access control (MAC) address associated with the mobile device and the controller is configured determine whether the one or more persons is an employee in response to the MAC address.

7. The apparatus of claim 1, wherein the packet data includes a phase associated with a wireless channel in communicating with the wireless transceiver.

8. The apparatus of claim 1, wherein the controller is configured to determine the motion projection utilizing at least a long short term memory model.

9. The apparatus of claim 1, wherein the wireless transceiver is a WIFI transceiver or a Bluetooth transceiver.

10. The apparatus of claim 1, wherein the controller is configured to output a heat map including a graphical representation of traffic density of an area.

11. The apparatus of claim 10, wherein the heat map includes a first color indicative of a first traffic density and a second color indicative of a second traffic density.

12. An apparatus, comprising:
a wireless transceiver configured to communicate packet data with a mobile device associated with one or more persons in a vicinity of the wireless transceiver; and
a controller in communication with the wireless transceiver, the controller configured to:
receive a plurality of packet data from one or more person, wherein the packet data includes channel state information that includes at least an amplitude information associated with a wireless channel communicating with the wireless transceiver;
identify the one or more persons as a customer or employee in response to the packet data including identifiable information associated with the mobile device; and
in response to the identifiable information identifying a customer, determine a motion projection of the one or more persons in response channel state information that includes at least the amplitude information associated with the wireless channel.

13. The apparatus of claim 12, wherein the wireless transceiver is configured to receive a media access control (MAC) address associated with the mobile device and the controller is configured to hash the MAC address.

14. The apparatus of claim 12, wherein the wireless transceiver is configured to receive a media access control (MAC) address associated with the mobile device and the controller is configured determine whether the one or more persons is an employee in response to the MAC address.

15. The apparatus of claim 12, wherein the packet data includes a phase associated with a wireless channel in communicating with the wireless transceiver.

16. The apparatus of claim 12, wherein the controller is configured to determine the motion projection utilizing at least a long short term memory model.

17. The apparatus of claim 1, wherein the wireless transceiver is a WIFI transceiver or a Bluetooth transceiver.

18. The apparatus of claim 1, wherein the controller is configured to determine the motion projection in response to channel state information of the packet data.

19. The apparatus of claim 12, wherein the apparatus further includes a camera configured to capture image data utilize to determine the motion projection.

20. A method of capturing image data utilizing a wireless transceiver, comprising:
receiving packet data from a mobile device associated with one or more persons in a vicinity of the wireless transceiver;
obtaining image data associated with a camera associated with a wireless transceiver;
receiving a plurality of packet data from the mobile device, wherein the packet data includes channel state information that includes at least an amplitude information associated with the wireless channel communicating with the wireless transceiver;
identifying the one or more persons as a customer or employee in response to the packet data including identifiable information associated with the mobile device; and
in response to the identifiable information identifying a customer, determine a motion projection of the one or more persons in response to the channel state information that includes at least the amplitude information associated with the wireless.

* * * * *